United States Patent [19]

Kofsky et al.

[11] 3,862,336

[45] Jan. 21, 1975

[54] ANIMAL FOOD AND METHOD OF MAKING THE SAME

[75] Inventors: Melvin Kofsky, Roslyn; Isidore Klebanow, Great Neck, both of N.Y.

[73] Assignee: Super Bowl Pet Foods, Inc., Maspeth, N.Y.

[22] Filed: Apr. 15, 1970

[21] Appl. No.: 28,927

Related U.S. Application Data

[63] Continuation-in-part of Ser. No. 517,449, Dec. 29, 1965, abandoned.

[52] U.S. Cl. ............... 426/1, 426/167, 426/168, 426/169, 426/210, 426/227, 426/350
[51] Int. Cl. ............................................. A23k 1/00
[58] Field of Search .......... 99/2, 7, 130, 131; 426/1, 426/167, 168, 169, 210, 227, 350

[56] References Cited
UNITED STATES PATENTS
3,202,514   8/1965   Burgess et al. ............................ 99/2

FOREIGN PATENTS OR APPLICATIONS
945,981   1/1964   Great Britain ............................ 99/2

Primary Examiner—Samih N. Zaharna
Assistant Examiner—J. M. Hunter
Attorney, Agent, or Firm—Louis F. Reed

[57] ABSTRACT

A microbiologically stable, substantially neutral, nutritionally balanced semi-plastic non-pasteurized, uncooked animal food composition which consists essentially of (1) a dried proteinaceous food substance, (2) an aqueous matrix including a water soluble colloidal binding and gelling agent selected from the group consisting of gelatin or water soluble gum, the amount of said gum or gelatin ranging from about ½ to about 10 percent by weight and (3) a water soluble, low molecular weight solid, liquid or mixture thereof in an amount sufficient to increase the osmotic pressure of the water in which it is dissolved thereby providing a bacteriostatic effect, the moisture content of the food composition ranging from about 15 percent to not greater than 25 percent, all percents by weight being based upon the weight of the total composition. It also concerns a process for preparing said animal food composition by blending a premix of the solids with a proportional amount of a pre-mix of the liquid with high-speed agitation.

12 Claims, No Drawings

ANIMAL FOOD AND METHOD OF MAKING THE SAME

CROSS-REFERENCE TO RELATED APPLICATION

This application is a continuation-in-part application of our copending U.S. application Ser. No. 517,449 filed Dec. 29, 1965 now abandoned.

BACKGROUND OF THE INVENTION

1. Field of the Invention

This invention relates to a novel food for animals and to a method of making the same. More particularly, it relates to an intermediate moisture product; that is, one having a moisture content in excess of 15 percent and substantially below 75 percent and one which is characterized by a completely meat-like appearance in color, consistency, texture and general handleability.

2. Description of the Prior Art

In the past, animal foods for domestic, laboratory and small animals were prepared in dry form. Pet foods, in addition, were also packed in canned form. The dry type ration is prepared in meal and pellet or nugget forms and typically has about 10 percent moisture. The canned type ration has a meat-like texture and a high moisture content of about 75 percent.

Dry type animal foods, generally have a high nutritional and caloric value, provide a complete and balanced diet for the animal and have excellent storage characteristics, thus permitting the use of relatively inexpensive packaging techniques. However, the palatability of many dry type animal foods is poor, necessitating the addition of liquids prior to their consumption. Therefore, the desirable nutritional characteristics of this form of animal food may be diminished by its relatively poor receptivity by the animal. In general, product stabilization against microbiological spoilage is achieved in such a product by maintaining the moisture content below the critical level for vegetative growth of such organisms as molds and bacteria.

Canned-type animal foods are generally received very favorably by animals, apparently due in part to their meat-like texture, consistency and aroma. However, the elevated moisture content of such product necessitates thermal processing in sealed containers to obtain a commercially sterile product, thereby adding significantly to the cost. Also, once the can is opened, it must be readily consumed since the product is conducive to supporting microbiological growth and will deteriorate very rapidly unless stored under refrigeration.

In general, an increase in the moisture level of animal food products will increase the palatability therof. However, any significant elevation of the moisture level of such foods above 10 percent levels leads to microbiological decomposition unless such products are packed in a hermetically sealed container and commercially sterilized or maintained in a frozen or refrigerated state throughout the period of distribution and storage by the consumer. Such packaging and preservation methods are expensive and not convenient to the consumer under all anticipated conditions of use.

It was not until 1963 that an intermediate moisture animal food product was successfully marketed, such product having been made pursuant to the teachings of Burgess U.S. Pat. No. 3,202,514. Prior to these teachings there were those set forth in Hallinan, et al., Canadian Pat. No. 560,490 which disclosed a condensed product which, by meeting certain specified processing and packaging conditions, could be maintained at a moisture level of about 30–40 percent. Essential to the requisite inhibition of microbiological growth by the Hallinan process is a thorough pasteurization of the product and maintenance of these pasteurization conditions throughout packing, filling and closing.

The objective of the Burgess and Hallinan patents is to provide an animal food having microbiological stability such that it can be packed using conventional moisture-protective wrapping materials while eliminating the necessity for hot packing or thermal sterilization incident to packing, and can be stored for extended periods of time under non-refrigerated conditions without incurring significant risk of microbiological spoilage. In an embodiment of the Burgess invention the meat component of the charge is pasteurized at a temperature of about 180°–212°F., say 200°F., for about 5 to 15 minutes, to kill bacteria and to produce a liquefied meat. To this mixture, which is preferably maintained at about the pasteurization temperature, the flavors, nutrients, colors, texturizing agent or agents and an anti-mycotic agent are added. A vegetable protein is then added to the slurry while it is maintained at a temperature which is said to be sufficiently high to effect gelatinization of the starch, typically at 150°–160°F., for 5–10 minutes. Sugar and protein balancing agents are then added to the mix while it is maintained at an elevated temperature of from 180°–220°F. for about 5–10 minutes. The cooked mixture, upon achieving uniformity of texture, is then packaged according to conventional wrapping procedures.

SUMMARY OF THE INVENTION

An object of our invention is to provide an animal food ration which is moist and highly palatable that can be packaged in conventional moisture-proof wrapping material without being subjected to the risk of microbiological spoilage when stored in non-refrigerated condition.

Another object of our invention is to process an animal food product in a continuous operation, without the necessity of pasteurization and the consequent requirement of cooling.

A further object of our invention is to process an animal food product whose plasticity and viscosity can be controlled and which can be manufactured in a continuous operation without the need for pasteurization.

It is also an object of our invention to provide a microbiologically stable, substantially neutral, nutritionally balanced semi-plastic non-pasteurized, uncooked animal food composition.

It is still another object to provide an animal food composition which is adapted for packaging without pasteurization and storage without refrigeration.

To provide proper nutritional balance for this type of animal food, a complete ration should include sources of dried vegetable and/or animal protein in conjunction with other proteinaceous and nutrition supplementing and balancing ingredients which would be blended with water soluble solids and liquids of low molecular weight. Further, there is included water soluble gums and/or gelatins which serve as colloidal binding and gelling agents. Water is added to raise the total moisture content to a level from about 15 percent to a maximum of 25 percent so that the water soluble gums and- /or gelatins can be hydrated sufficiently, and can perform their role in the water phase. It is to be understood that the amount of water added is not to exceed the amount of the water soluble, low molecular weight solids and liquids hereinafter further defined necessary to give use to the bacteriostatic effect.

The dried animal and marine products include those such as meat meal, meat scrap, whale meat, animal liver and glandular meal, poultry by-products meal, fish meal, condensed fish soluble, crab and shrimp meal and other dried products as described in the Official Publication of the Association of American Feed Control Officials.

The term "vegetable protein source" applies to oil seeds and legumes. Typical of such vegetable protein sources are soy bean, soy bean meal, cottonseed meal, peanut meal, and others similarly defined by the Feed Control Association.

The proteinaceous and nutrition supplementing and balancing ingredients referred to above consist principally of dried grains, legumes, and milk products. In addition, vegetable and/or animal fats, minerals and vitamins are included in this group. Some of the ingredients described add a desirable texture to the product in addition to their nutritive value.

Examples of the dried grains, legumes, and milk products might include oat meal, soy bran, wheat bran alfalfa meal and dried whey.

Examples of the vegetable and animal fats might include soy bean oil, corn oil, tallow and fish oil.

The minerals and vitamins would include those necessary for the animal's requirements.

The term "water soluble solids and liquids of low molecular weight" refers principally to sugars which are capable of increasing the osmotic pressure of the water in which they are dissolved and thereby giving rise to the requisite bacteriostatic effect. In addition, other low average molecular weight materials such as sorbitol, propylene glycol, and common salt (NaCl) capable of endowing the animal food with microbiological protection may be included in this group. The term "bacteriostat" is used herein to define a material having this requisite bacteriostatic effect.

While the character of the materials resist bacterial decomposition due to the osmotic pressure provided by the low molecular weight water soluble solids, the moisture added also serves to make the materials conducive to growth of molds and yeasts. Therefore, an antimycotic agent should be used to reduce this danger, and inhibit mold and yeast growth. The amount of antimycotic agent used will depend on the type used and the particular product composition. Some agents used are potassium sorbate, sorbic acid, sodium benzoate and others generally recognized that can be directly incorporated in the mass, sprayed on the final product or added to the surface of the packaging material. The type of water soluble gums and gelatins of our invention include but are not limited to algin, Irish moss extract, karaya gum, agar-agar, beef gelatin and lamb gelatin. These agents are the controlling factors of the gel body, enabling production of a range from light semigels to firm, heavy gels. The control of the plasticity of the final product mass is also accomplished with these agents.

The quantity of the water soluble gum and/or gelatin that will be necessary will depend on the specific type used, the desired firmness of the gelation and the final particle size. Small products such as pellets or nuggets may require less binding materials than large patties or cakes due to the compression involved in processing. While the preferred quantities of water soluble gums and gelatins are set forth below, the basic concept underlying the subject method and product can be accomplished by using verying quantities of gelling and binding materials up to a maximum of 10 percent.

Algin is the general term designating the hydrophilic, or water-loving derivatives of alginic acid. This natural colloid is extracted from several types of brown seaweed. Alginic acid is a colloidal polyuronic acid composed mainly of anhydrous beta-D manneuronic acid residues linked together in the 1:4 position to form a long straight chain molecule. The most commonly known algin is sodium alginate, but other commercially important compounds are the potassium, ammonium, calcium and propylene glycol alginates as well as alginic acid itself.

Some commercially known algin products that can be used are improved kelmar, kelmar, kelco-gel, keltose, and kelcosol.

In addition, a well known reaction of algin and polyvalent cations can be used to form a gel structure of the water phase that comprises the matrix for the remainder of the product. Also, this gel can be adjusted by varying the concentrations of the algin and/or the polyvalent cations to modify the bind strength and the plasticity of the mass. Through the use of an algin gel system, a combination of lubricity and plasticity is imparted to the product that affords unusual ability to be formed either in pellet or cake shape. In particular, a polyvalent cation that can be used to react with algin to give the above gel is calcium, from a calcium salt such as calcium citrate.

With the use of algin, the preferred range of quantity will vary from ½ to 2 percent depending on the desired plasticity. The greater amounts of algin used will necessitate a greater use of a calcium salt for reaction. Quantities used in less than the preferred range tend to produce a product that may be mealy in nature, while excessive quantities used, besides being uneconomical, tend to produce an extremely hard product, and causes difficulty in mixing and processing.

Gelatin is a glutinous material obtained from either beef or lamb tissues. It is manufactured and sold in different bloom strengths. With gelatin, the preferred range of the quantity use will depend on the bloom strength, the desired plasticity and the size of the final product. A range of from 1 to 3 percent has been found to be preferred. Lower quantities used tend to produce a product mealy in nature, while greater quantities used cause difficulties in manufacturing.

Agar-agar and Irish moss extract are seaweed extracts, and can also be used processing this product.

In practice of one preferred embodiment, the dried animal or marine meal, soy meal, soy grits, dried whole whey, sucrose, flaked soy bean hulls, flavors, color, nutrients, vitamins, dry antimycotic agents, and, as the binding agent, a gelatin or water soluble gum are premixed and stored in a hopper bin. The water, animal fat, propylene glycol, sorbitol and emulsifier are premixed in a tank, in their proper proportions to the formula. The dry and liquid pre-mixes are then blended together in a high speed mixer to provide a thorough blending and to provide the desired reactions. If the algin gel is utilized as the binding agent, forming and packaging may be accomplished immediately as the temperature of the mass while being processed and formed will be at the desired rate of temperature (80°–90°F.) to insure a low level of condensation on the packaging materials.

Where gelatin is utilized as the binding agent, some heat is necessary (in the form of steam in the processing or in some other conventional form) to bring the total mass to a temperature of approximately 100°–110°F., so that the gelatin can be dissolved into the aqueous phase and thoroughly mixed, so that on cooling, the matrix, consisting of the water phase, will form a gel system encompassing the solid materials.

The following examples set forth some of the preferred formulations for animal foods which embody the inventive aspects of the present invention:

EXAMPLE I

The following is a formulation of an intermediate moisture dog food product:

| | |
|---|---|
| Meat Meal | 17.5% |
| Soy Grits | 15.0% |
| Soy Meal | 10.0% |
| Sucrose | 15.0% |
| Dried Whole Whey | 7.5% |
| Flaked Soy Bean Hulls | 3.5% |
| Dicalcium Phosphate | 1.5% |
| Sodium Chloride | 0.7% |
| Improved Klemar-Potassium Alginate | 1.0% |
| Calcium Citrate | 0.5% |
| U.S. Certified Color | 0.2% |
| Garlic | 0.2% |
| Mono-and Di-glycerides | .5% |
| Vitamin and Mineral Supplement | .7% |
| Potassium Sorbate | .3% |
| Water (added) | 15.0% |
| Sorbitol | 2.0% |
| Propylene Glycol | 4.0% |
| Tallow | 5.0% |

The liquid portion consisting of the water, animal fat, sorbitol, propylene glycol and mono- and di-glycerides was premixed and then stored in a tank. The remainder of the formula, consisting of the dry materials, was pre-mixed and stored in a hopper bin. The two pre-mixes were then fed in proper proportion with the aid of meters into a high speed mixer. The continuous stream of mixed materials was then discharged onto a conveyor that fed the patty machine where forming took place. The patties were then transferred to the wrapping machine where the polyethylene packaging material enveloped the patty in order to minimize the loss of water vapor. All forming and packing was done at room temperature; no discoloration and decomposition of the product was evident after a period of 6 months. The moisture content of the formed product, when packaged, was 22.0 percent.

EXAMPLE II

The following is a formulation of an intermediate moisture cat food:

| | |
|---|---|
| Fish Meal | 17.5% |
| Soy Grits | 15.0% |
| Soy Meal | 10.0% |
| Sucrose | 15.0% |
| Dried Whole Whey | 7.5% |
| Flaked Soy Bean Hulls | 2.5% |
| Dicalcium Phosphate | 1.5% |
| Sodium Chloride | 0.7% |
| Gelatin | 2.5% |
| U.S. Certified Color | 0.2% |
| Garlic | 0.2% |
| Mono-and Di-glycerides | 0.5% |
| Vitamin and Mineral Supplement | 0.7% |
| Potassium Sorbate | 0.3% |
| Water (added) | 15.0% |
| Sorbitol | 2.0% |
| Tallow and Fish Oil | 5.0% |

The liquid portion consisting of the water, tallow, fish oil, sorbitol, propylene glycol and mono- and di-glycerides was pre-mixed and then stored in a tank. The remainder of the formula, consisting of the dry materials, was pre-mixed and stored in a hopper bin. The two pre-mixes were then fed in proper proportion with the aid of meters into a high speed mixer. Dry steam was injected in the mixer to bring the temperature of the mass to a temperature of approximately 100°–110°F. to enable the gelatin to dissolve and mix uniformly with the water phase. Upon discharge the mass was transferred on a conveyor that has exhaust equipment so located, so that the injected steam was for the most part removed and thereby caused a reduction of the mass temperature to 80°–90°F., a range in which the forming and packing can be done in with optimum results. From the discharge conveyor, the material was brought to a meat-type extruder where the mass was formed in small uniform pieces and discharged into another machine for weighing, filling, and bag sealing. The moisture content of the formed product, when packaged, was 23.4 percent.

EXAMPLE III

The following is a formulation of an intermediate moisture horse feed:

| | |
|---|---|
| Oat Groats | 20.0% |
| Soy Grits | 17.0% |
| Flaked Soy Hulls | 3.0% |
| Wheat Bran | 5.0% |
| Sucrose | 15.0% |
| Water (added) | 15.0% |
| Dried Whole Whey | 10.0% |
| Vegetable Oil | 5.0% |
| Propylene Glycol-Sorbitol | 4.0% |
| Salt | 1.0% |
| Improved Kelmar | 2.0% |
| Calcium Citrate | 1.0% |
| Potassium Sorbate | .5% |
| Vitamin and Mineral Supplement | 1.5% |
| Flavor | Trace |

The liquid portion, consisting of the water, vegetable oil, sorbitol, propylene glycol, and emulsifier was pre-mixed and stored in a tank. The dry materials consisting of the remainder of the formula were pre-mixed and stored in a hopper bin. The two pre-mixes were blended, in proper proportion, in a high speed mixer where the algin was hydrated and reacted, forming a gel of the water phase. The mass was discharged and conveyed to the forming and packaging areas. The moisture content of the formed product, when packaged, was 21.2 percent.

EXAMPLE IV

The following is a formulation of an intermediate moisture cat food:

| | |
|---|---|
| Soy Flakes | 20.0% |
| Wheat Bran | 15.0% |
| Meat Meal | 10.0% |
| Alfalfa Meal | 10.0% |

-Continued

| | |
|---|---|
| Sucrose | 15.0% |
| Water (added) | 15.0% |
| Tallow | 5.0% |
| Salt | 1.0% |
| Calcium Carbonate | 1.0% |
| Vitamin and Mineral Pre-mix | 1.0% |
| Sorbitol | 3.0% |
| Propylene Glycol | 3.0% |
| Algin-Improved Kelmar | .50% |
| Calcium Citrate | .25% |
| Potassium Sorbate | .25% |

EXAMPLE V(a)

The following is a formulation of an intermediate moisture dog food:

| | |
|---|---|
| Soy Grits | 25.0% |
| Meat Meal | 15.0% |
| Sucrose | 15.0% |
| Dried Whole Whey | 10.0% |
| Water (added) | 15.0% |
| Tallow | 5.0% |
| Flaked Soy Hulls | 3.5% |
| Algin-Improved Kelmar | 1.5% |
| Calcium Citrate | 0.75% |
| Sorbitol | 3.0% |
| Propylene Glycol | 3.0% |
| Vitamin and Mineral Pre-mix | 2.25% |
| Color and Flavor | 1.0% |

In the formulations of Examples IV and V(a), the liquid portion, consisting of the tallow, water, sorbitol, propylene glycol, and one half of the improved kelmar was pre-mixed in a liquid blender and stored in a tank. The algin, in addition to being a binding agent, acted as an emulsifier. The remaining dry materials were pre-mixed in a batch mixer and stored in a hopper bin. The two pre-mixes were then fed simultaneously, in proper proportion, to a high speed mixer, where they were mixed. Upon discharge, they were conveyed to a forming machine where pellets were extruded. The product obtained exhibited a considerable degree of cohesiveness and good plasticity. The pellets were then transferred to a packaging machine for bagging, so that moisture loss could be prevented.

The pellets were highly palatable, to a test group of rats after four months from time of manufacture. They also did not undergo any bacteriological decomposition or develop any molds. The bacterial level was calculated at 2,500 colories per gram, approximately the same as the original material batch. The moisture content of the formed product, when packaged, was 20.7 percent.

EXAMPLE V(b)

Following the teachings of Burgess, et al., U.S. Pat. No. 3,202,514 at column 9, lines 68 ff, and using the formulation of Example VI of said Burgess et al. patent in the bowl of a 2-quart Hobart mixer, 241 ml of water were heated just to boiling and the following added with constant stirring in the order listed:

| | |
|---|---|
| Sodium chloride | 10 parts |
| Propylene glycol | 21 parts |
| Sorbitol (70 per cent) | 21 parts |
| Potassium sorbate | 3 parts |
| Calcium citrate | 5 parts |
| Melted tallow (at 200°F) | 42 parts |

The liquid in the bowl was again reheated to 210°F., and the following additional ingredients added, while the mixing paddle was running at medium speed:

| | |
|---|---|
| Soy flakes (grits) | 335 parts |
| Soy hulls | 31 parts |
| Sucrose | 220 parts |
| Meat meal | 73 parts |

The mixture was maintained above 160°F. for 10 minutes and then the mixer was allowed to run until the temperature of the mass cooled to approximately 80°F. and the entire contents of the bowl transferred to a Hobart meat grinder and extruded through a Teflon plate drilled with 3/16th inch diameter holes. In comparison to the product of Example V(a), the product obtained in V(b) crumbled during extrusion from the die and yielded a mass of quite friable fragments, none of which exceeded about 1 inch in length.

It will be evident that the formulation described above in Examples I–V(a) defines an animal food product which has a sufficiently high moisture content to be palatable and which can be packaged without sterilization and stored for long periods of time in unrefrigerated condition without running the risk of bacteriological spoilage.

The sources of dried vegetable and animal protein, the proteinaceous and nutrient supplementing and balancing ingredients, water and fats were all, to begin with, of low bacterial levels and activity. The inclusion of the water soluble solids and liquids of low molecular weight increased the osmotic pressure of the water phase in which they were dissolved and thereby gave rise to the stabilized bacteriostatic effect and condition. In addition, the antimycotic agent was included to inhibit mold and yeast growth conditions. Furthermore, the plasticity and viscosity of the product, which determines to a great extent the deformability and shape-retaining characteristics of the animal food, was closely controlled by the nature and quantity of the gelling and binding agents included in the formulation.

The resulting animal food, it has been demonstrated, is made without the need for pasteurization and the consequent cooling requirement, whereby the process is one which can be continuous and highly economical.

We claim:

1. A microbiologically stable, substantially neutral, nutritionally balanced semi-plastic non-pasteurized, uncooked animal food composition which consists essentially of
   1. a dried proteinaceous food substance,
   2. an aqueous matrix including a water soluble colloidal binding and gelling agent selected from the group consisting of gelatin or water soluble gum, the amount of said gum or gelatin ranging from about ½ to about 10 percent by weight, and
   3. a water soluble, low molecular weight solid, liquid or mixture thereof in an amount sufficient to increase the osmotic pressure of the water in which it is dissolved thereby providing a bacteriostatic effect, the moisture content of the food composition ranging from about 15 percent to not greater than 25 percent, all percents by weight being based upon the weight of the total composition.

2. An animal food composition as defined in claim 1 wherein there is present a vegetable food substance.

3. An animal food composition as defined in claim 1 wherein the water-soluble colloidal binding and gelling agent is selected from the class consisting of natural gums and gelatin.

4. An animal food composition as defined in claim 1 wherein the water soluble material is a sugar.

5. An animal food composition as defined in claim 3 wherein the binding and gelling agent is an algin substance.

6. An animal food composition as defined in claim 5 wherein the algin substance is the reaction product of alginic acid salt and a polyvalent metal cation.

7. An animal food composition as defined in claim 6 wherein the alginic acid salt is potassium alginate and the polyvalent metal cation is calcium.

8. An animal food composition as defined in claim 3 wherein the binding and gelling agent is gelatin.

9. An animal food composition as defined in claim 1 wherein the aqueous matrix includes added water which is not in excess of the amount of the water soluble, low molecular weight material.

10. An animal food composition as defined in claim 1 wherein the composition includes an antimycotic agent.

11. A non-pasteurizing, non-cooking process for preparing a microbiologically stable, substantially neutral, nutritionally balanced semi-plastic animal food composition which consists essentially of blending a mixture comprising a dried proteinaceous food substance, a water soluble colloidal binding or gelling agent selected from the group consisting of a water soluble, gum or gelatin and a water soluble, low molecular weight solid, liquid or mixture thereof with an aqueous liquid with high speed agitation without pasteurization to produce said food composition, the amount of said gum or gelatin ranging from about ½ to about 10 percent by weight and the amount of said water-soluble, low molecular weight material being sufficient to increase the osmotic pressure of the water in which it is dissolved thereby providing a bacteriostatic effect, the moisture content of said food composition ranging from about 15 percent to not greater than 25 percent by weight, all percentages by weight being based upon the weight of the total food composition.

12. The process of claim 11 wherein said binding agent is gelatin and said blending is effected at a temperature below that necessary for pasteurization but sufficiently high to hydrate gelatin.

* * * * *